United States Patent
Kim et al.

(10) Patent No.: US 8,194,876 B2
(45) Date of Patent: Jun. 5, 2012

(54) SOUND TRANSMISSION SYSTEM

(75) Inventors: Sung-Eun Kim, Seoul (KR);
Sung-Weon Kang, Daejeon (KR);
Chang-Hee Hyoung, Daejeon (KR);
Jin-Bong Sung, Daejeon (KR);
Jin-Kyung Kim, Daejeon (KR);
Duck-Gun Park, Daejeon (KR);
Chang-Kyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1586 days.

(21) Appl. No.: 11/297,516

(22) Filed: Dec. 7, 2005

(65) Prior Publication Data

US 2006/0143004 A1 Jun. 29, 2006

(30) Foreign Application Priority Data

Dec. 8, 2004 (KR) .......................... 10-2004-0103036
Oct. 25, 2005 (KR) .......................... 10-2005-0100624

(51) Int. Cl.
*H04B 3/00* (2006.01)
(52) U.S. Cl. .............................. 381/77; 381/151; 381/97
(58) Field of Classification Search .................... 381/77, 381/151, 79, 89, 150, 120, 97, 1
See application file for complete search history.

(56) References Cited

U.S. PATENT DOCUMENTS

| 5,569,854 A | * | 10/1996 | Ishida et al. ..................... 73/628 |
| 6,169,813 B1 | * | 1/2001 | Richardson et al. .......... 381/312 |
| 6,229,899 B1 | * | 5/2001 | Norris et al. ..................... 381/77 |

FOREIGN PATENT DOCUMENTS

| JP | 2002-314490 | 10/2002 |
| KR | 10-2006-0022739 | 3/2006 |

* cited by examiner

*Primary Examiner* — Vivian Chin
*Assistant Examiner* — Con P Tran
(74) *Attorney, Agent, or Firm* — Sherr & Vaughn, PLLC

(57) ABSTRACT

The present invention relates to a sound transmission system using a human body as a propagation medium. The transmission system includes a first signal transmitter and a second signal transmitter respectively generating signals having frequencies corresponding to each other, the first and second signal transmitters being coupled to the human body, wherein the first and second signal transmitters respectively generate high frequency signals having an opposite phase to each other, and the respective signal transmitters combine the audio signals and the high frequency signals to transmit the combined signals to the human body. The respective signal transmitters combine the generated audio signals and high frequency signals, adjust an output phase of the combined signals, and transmit the combined signals through the human body.

20 Claims, 4 Drawing Sheets

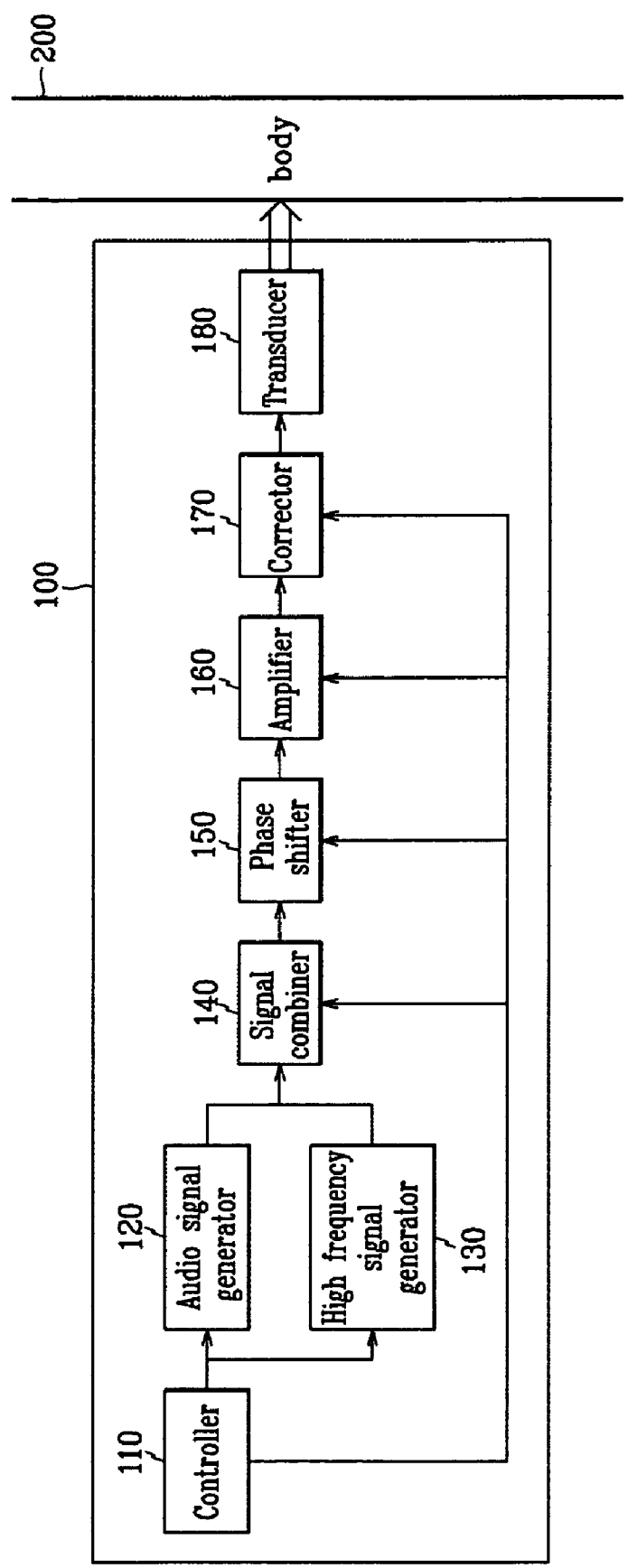

SOUND TRANSMISSION SYSTEM

CROSS-REFERENCE TO RELATED APPLICATION

This application claims priority to and the benefit of Korean Patent Application No. 10-2004-0103036 filed in the Korean Intellectual Property Office on Dec. 8, 2004, and No. 10-2005-0100624 filed in the Korean Intellectual Property Office on Oct. 25, 2005, the entire contents of which are incorporated herein by reference.

BACKGROUND OF THE INVENTION (a) Field of the Invention

The present invention relates to a sound transmission system using the human body as a propagation medium, and more specifically, relates to a system for transmitting an audio signal through a human body by using two signal transmitters.

(b) Description of the Related Art

Human body communication is where a signal is transmitted by using a human body rather than by using a wire. In human body communication, the electric signal is transmitted through the human body without using electric wires since the human body conducts electricity.

In a conventional sound transmission system using the human body as a communication channel, an audio signal is delivered when both a transmitter transmitting a modulated electric signal and a receiver receiving the transmitted electric signal and demodulating the received electric signal to an audio signal of sensible frequency bandwidth are directly attached to the human body. That is, in the conventional sound transmission system, when the audio signal to be delivered is modulated to an electric signal transmittable through the human body and the modulated electric signal is output to be transmitted through the human body, the receiver attached to an area around an ear of the human body receives the transmitted electric signal and demodulates the signal to convert it to an audible sound. However, there are inconveniences in that it is required to provide the transmitter and the receiver respectively for the conventional sound transmission system and the sound may be heard only if the receiver is attached to the human body.

The above information disclosed in this Background section is only for enhancement of understanding of the background of the invention and therefore it may contain information that does not form the prior art that is already known in this country to a user of ordinary skill in the art.

SUMMARY OF THE INVENTION

The present invention has been made in an effort to provide a sound transmission system for allowing a user to hear an audio signal transmitted by using a human body as a propagation medium. An exemplary sound transmission system using the human body as a propagation medium according to an embodiment of the present invention includes first and second signal transmitters for respectively generating high frequency signals having the same frequencies at least higher than an audible frequency bandwidth and having opposite phases to each other, and the first and second signal transmitters are attached to the human body.

The first and second signal transmitters respectively generate high frequency signals having an opposite phases to each other, and the respective signal transmitters combine the audio signals and the high frequency signals to output combined signals to the human body. The high frequency signals among the combined signals output by the first and second signal transmitters are eliminated by interference around the ears of the human body, and so only the audio signals may be sensed by the auditory organs.

An exemplary sound transmission system using the human body as a propagation medium according to another embodiment of the present invention includes a first signal transmitter and a second signal transmitter respectively generating high frequency signals having the same frequencies at least higher than an audible frequency bandwidth and having opposite phases to each other, and the first and second signal transmitters coupled to the human body.

In addition, the first signal transmitter includes an audio signal generator, a high frequency signal generator, a signal combiner, a controller, and a transducer. The audio signal generator generates an audio signal of audible frequency bandwidth, the audio signal to be delivered to an ear, and the high frequency signal generator generates a high frequency signal having a frequency higher than at least the audible frequency bandwidth. The signal combiner combines the generated audio signal and high frequency signal. The controller adjusts the signals and frequencies respectively generated by the audio signal generator and the high frequency signal generator, and controls the signal combiner to combine the signals. In addition, the transducer outputs the signal generated by the signal combiner to the human body. The second signal transmitter may include the high frequency signal generator, the controller, a phase shifter, an amplifier, and the transducer.

BRIEF DESCRIPTION OF THE DRAWINGS

FIG. 2 shows a block diagram representing a signal transmitter forming the sound transmission system according to the exemplary embodiment of the present invention.

DETAILED DESCRIPTION OF THE EMBODIMENT

Figure 1:
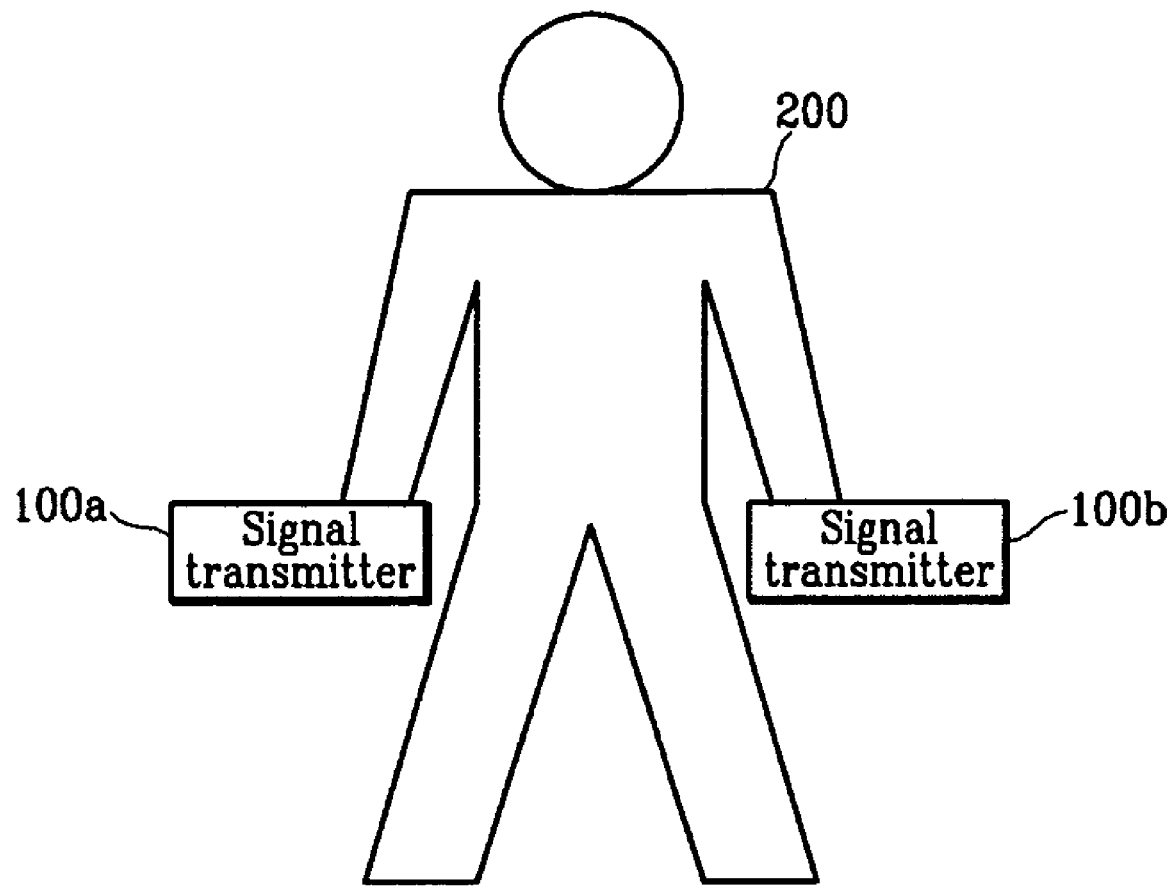
FIG. 1 shows a diagram representing a sound transmission system according to an exemplary embodiment of the present invention.

An exemplary embodiment of the present invention will hereinafter be described in detail with reference to the accompanying drawings.

In the following detailed description, only a preferred exemplary embodiment of the present invention has been shown and described, simply by way of illustration. As those skilled in the art would realize, the described embodiment may be modified in various different ways, all without departing from the spirit or scope of the present invention.

Accordingly, the drawings and description are to be regarded as illustrative in nature and not restrictive, and like reference numerals designate like elements throughout the specification. Throughout this specification and the claims which follow, unless explicitly described to the contrary, the word "comprise", and variations such as "comprises" or "comprising", should be understood to imply the inclusion of the stated elements but not the exclusion of any other elements.

A sound transmission system according to an exemplary embodiment of the present invention will be described with reference to the figures.

FIG. 1 shows a diagram representing the sound transmission system according to the exemplary embodiment of the present invention. As shown in FIG. 1, the sound transmission system according to the exemplary embodiment of the present invention includes two signal transmitters 100a and 100b directly attached to a human body 200. In FIG. 1, the two signal transmitters 100a and 100b are respectively attached to respective areas of the human body 200 at the same distance from respective ears, so as to form the sound transmission system. Accordingly, a user may directly receive an audio signal without performing an additional data process for demodulating the signal transmitted through the human body 200 since destructive interference on ultrasonic components of signals transmitted from the respective signal transmitters 100a and 100b is made by itself. In this case, the signal transmitters 100a and 100b combine the audio signal with a high frequency signal, and transmit the combined signal through the human body 200. While constructive interference on ultrasonic components of signals occurs, a user may not sense a signal generated by the constructive interference since the signal exceeds audible frequency bandwidth. Therefore, the present invention will be described while focusing on the destructive interference.

The signal transmitters 100a and 100b forming the sound transmission system will now be described with reference to FIG. 2, and since the two signal transmitters 100a and 100b have the same configuration, one signal transmitter with a reference numeral 100 will be described.

FIG. 2 shows a block diagram representing a signal transmitter 100 forming the sound transmission system according to the exemplary embodiment of the present invention. As shown in FIG. 2, the signal transmitter 100 according to the exemplary embodiment of the present invention includes a controller 110, an audio signal generator 120, a high frequency signal generator 130, a signal combiner 140, a phase shifter 150, an amplifier 160, a corrector 170, and a transducer 180.

As shown in FIG. 1, the signal transmitter 100 is attached to the human body 200 so as to transmit the signal through the human body 200. The signal transmitter 100 according to the exemplary embodiment of the present invention may be formed as a hand-held transmitter type.

The controller 110 receives information on a distance between the signal transmitter 100 and an ear of the human body 200, and controls frequencies and phases of signals to be generated by the audio signal generator 120 and the high frequency signal generator 130. The controller 110 controls the ultrasonic component in the combined signal output from the two signal transmitters 100 to be eliminated around the ear of the human body 200 by the destructive interference, whilst allowing the audio signal of the audible frequency bandwidth to be delivered to the ear. Accordingly, a sound may be heard without using an additional receiver. Therefore, the controller 110 of the signal transmitter 100a or 100b attached to the human body 200 changes the frequency and the phase of the high frequency signal based on a distance from the signal transmitter 100a or 100b to the ear and a distance from one signal transmitter 100a to the other signal transmitter 100b attached to the same human body 200. When the two signal transmitters 100 are respectively attached to respective areas of the human body 200 while having the same distance from the respective ears, the respective controllers 110 of the signal transmitters 100 may control the high frequency signal generators 130 to generate high frequency signals having the same frequency but opposite phases to each other. That is, the controller 110 adjusts the frequencies of output signals generated by the audio signal generator 120 and the high frequency signal generator 130 so that the audio signal of audible frequency bandwidth may be delivered to an ear since the high frequency signals are eliminated around the ears by the interference between signals output from the two signal transmitters 100. In this case, a stereophonic sound effect may be achieved since the controller 110 of each of the two signal transmitters 100 controls the frequency and the phase of the high frequency signal, and varies a destructive interference generation area and time in the human body 200.

In addition, the controller 110 controls the phase shifter 150 to shift a phase of the output signal and adjust the phase and frequency of the output signal to match an impedance with the human body 200 to which the signal transmitter 100 is attached. In addition, the controller 110 extracts clock information stored in a memory (not shown) of the signal transmitter 100 and impedance information of the human body 200, and provides the extracted information to the corrector 170 to modify a signal to be transmitted through the human body 200.

The audio signal generator 120 receives the signal from the controller 110, extracts data from the memory, and generates the audio signal of the audible frequency bandwidth. In addition, the audio signal generator 120 may generate the audio signal by using data input from an external communication apparatus.

The high frequency signal generator 130 generates the high frequency signal to be combined with the signal output by the audio signal generator 120 according to a control signal from the controller 110. A frequency of the generated high frequency signal may vary according to the frequency of the audio signal to be delivered and the impedance of the human body 200. The high frequency signal generated by the two signal transmitters 100a and 100b shown in FIG. 1 are controlled to respectively have opposite phases to each other so that the high frequency signal is eliminated by the destructive interference around the ear of the human body 200.

The signals respectively output from the audio signal generator 120 and the high frequency signal generator 130 are combined and transmitted through the signal combiner 140. The signal combiner 140 combines the audio signal and the high frequency signal so as to minimize an attenuation occurred by the impedance characteristics in the human body while the signal is transmitted through the human body 200. In addition, the respective signal combiners 140 in the two signal transmitters 100 attached to the human body 200 combine the two high frequency signals respectively corresponding to each other so that the high frequency signals are eliminated around the ear.

The phase shifter 150 shifts an output phase of the combined signal of the high frequency signal and the audio signal, the combined signal having been transmitted from the signal combiner 140, according to the control signal of the controller 110. Accordingly, since phases of the signals output from the two signal transmitters 100a and 100b in the sound transmission system according to the exemplary embodiment of the present invention are controlled, the ultrasonic components may be eliminated when the two signals are overlapped around the ears. In addition, when there is a big difference between a distance from a left ear to the signal transmitter 100a attached on a left side of the human body 200 and a distance from a right ear to the signal transmitter 100b attached on a right side of the human body 200, a time delay of one of the signals is set so that the destructive interference of ultrasonic component is still maintained around the ears, and therefore, the phase of the signal to be transmitted may be adjusted. In addition, an interference generation area in the human body 200 may be adjusted since the phases of the signals transmitted from the two signal transmitters 100a and 100b are shifted by adjusting the time delay in the phase shifter 150.

A general phase shifting method for electrically or mechanically shifting a signal phase such as a line shifting type phase shifting method may be used in the phase shifter 150 according to the exemplary embodiment of the present invention.

The amplifier 160 increases an output level of the signal so that the signal attenuation caused in the human body 200 can be compensated. In this case, by adjusting an amplification rate in the amplifier 160, the controller 110 may flexibly operate according to variations of propagation medium conditions including a skin condition on which the signal transmitter 100 is attached and a health status of the human body 200.

In addition, when the audio signal and the high frequency signal are combined and transmitted through the human body, the corrector 170 performs a calibration to solve a problem in controlling a sound quality, the problem occurring because of a signal distortion caused by the transmission characteristics of the human body 200. That is, the calibration according to the human body characteristics is required to be performed since the human body characteristics depends on the skin condition and health status of the human body 200.

The transducer 180 is directly attached on the human body 200 to output the combined signal of the audio signal and the high frequency signal to the human body 200. In addition, the transducer 180 acoustically couples to the human body 200. That is, the transducer 180, which is a piezoelectric one or electrostatic one, converts the signal to be transmitted into a vibration signal which is transmittable and restorable, and transmits the converted signal to the human body 200.

While it has been described that the corrector 170 of the signal transmitter 100 according to the exemplary embodiment of the present invention is provided after the amplifier 160 and corrects the signal combined by the signal combiner 140 to correct the frequency characteristics and input/output characteristics, the input signal may be corrected before the signal combiner 140, and then the subsequent processes may be performed. In addition, the signal transmitter 100 according to the exemplary embodiment of the present invention may include a constituent element for performing a sensing function to measure a distance between the left or right ear and an area on which the signal transmitter 100 is attached.

An operation for delivering the audio signal in the sound transmission system according to the exemplary embodiment of the present invention will now be described with reference to FIG. 3A to FIG. 3F.

Figure 3A:
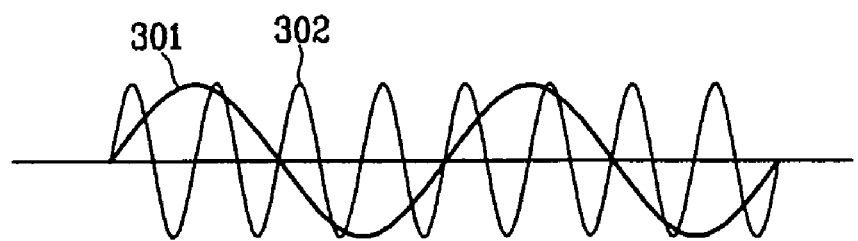
FIG. 3A to FIG. 3F show diagrams respectively representing waveforms generated when signals transmitted from the two signal transmitters according to the exemplary embodiment of the present invention cause a destructive interference and a constructive interference.
Figure 3B:
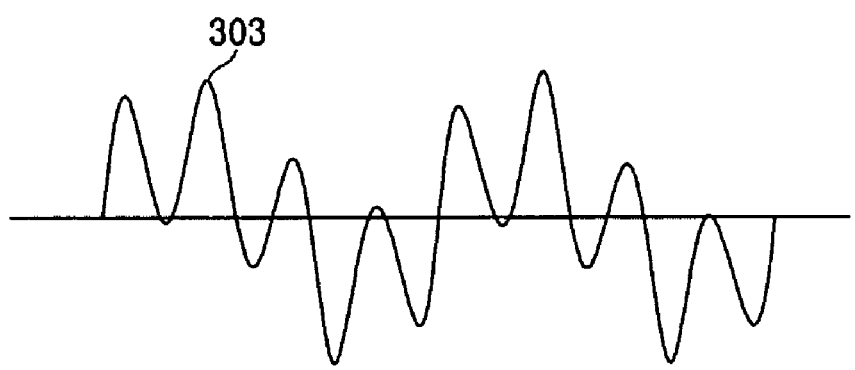
Figure 3C:
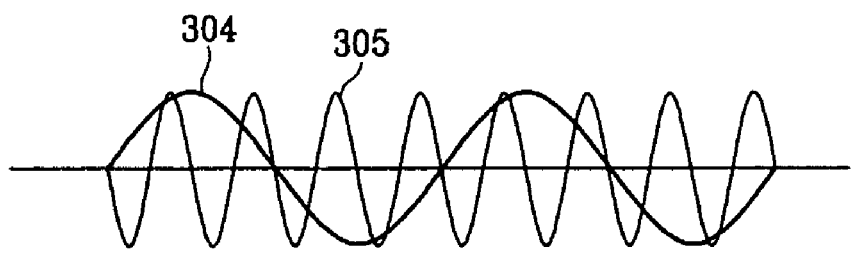
Figure 3D:
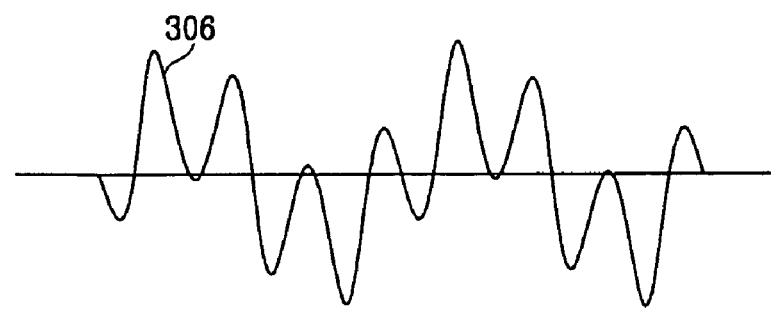

FIG. 3A shows a diagram representing respective waveforms of an audio signal 301 and a frequency signal 302 that are generated by the signal transmitter 100a shown in FIG. 1, and FIG. 3B shows a diagram representing a waveform 303 of a combined signal of the two signals 301 and 302. FIG. 3C shows a diagram representing respective waveforms of an audio signal 304 and a high frequency signal 305 that are generated by the other signal transmitter 100b shown in FIG. 1. FIG. 3D shows a diagram representing a waveform 306 of a combined signal of the two signals 304 and 305 shown in FIG. 3C. The phase of the high frequency signal 305 shown in FIG. 3C is half period phase ahead of the that of the high frequency signal 302 shown in FIG. 3A. That is, the high frequency signal 305 has an opposite phase of the high frequency signal 302.

Figure 3E:
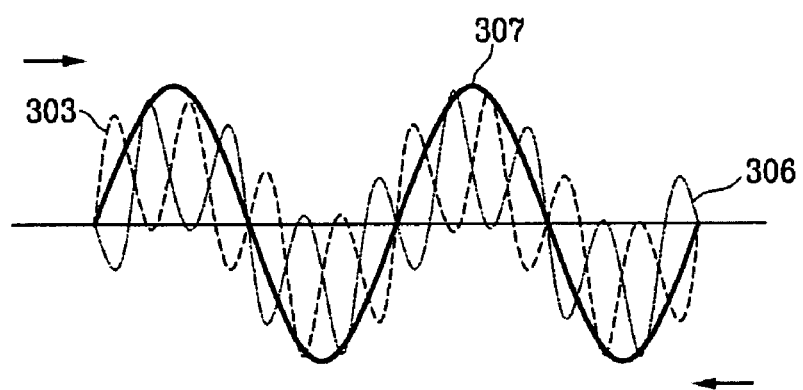
Figure 3F:
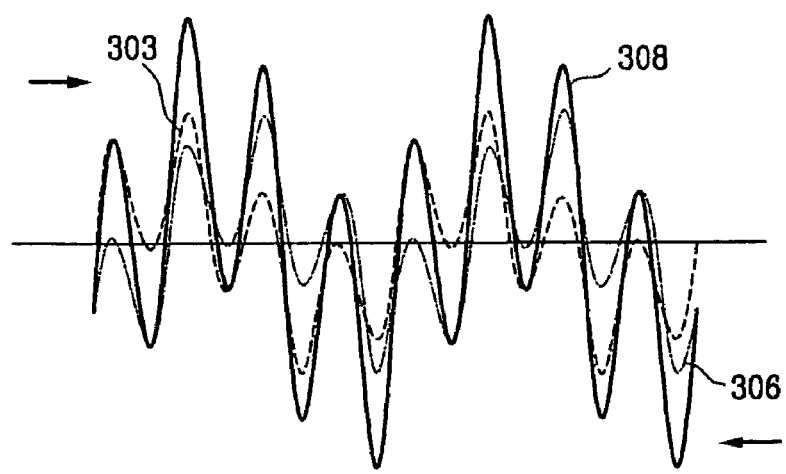

FIG. 3E shows a diagram representing a waveform 307 generated by destructive interference of ultrasonic components caused by overlapping of the two signals 303 and 306 respectively having different phases from each other, the two signals 303 and 306 generated by the two signal transmitters 100a and 100b. FIG. 3F shows a diagram representing a waveform 308 generated by the constructive interference of ultrasonic components caused by the overlapping of the two signals 303 and 306. When the destructive interference is generated as shown in FIG. 3E, the high frequency signal is eliminated, and so only the audio signal is delivered to the ears. In addition, when the constructive interference is generated as shown in FIG. 3F, the resultant signal still having a frequency component higher than the audible frequency bandwidth, but a user cannot sense this signal. Therefore, the signal generated by the destructive interference as shown in FIG. 3E may be sensed.

In addition, since the signals output from the two signal transmitters 100a and 100b are continuously transmitted through the human body, a point having the constructive interference is switched to a point having the destructive interference and the point having the destructive interference is switched to the point having the constructive interference as the signal propagate through the human body. Accordingly, as time goes on, sound may be sensed in all areas in which the two transmitted signals are overlapped.

While it has been described that the controller 110 controls the amplitude summation between the audio signal and the high frequency signal according to the exemplary embodiment of the present invention, the controller 110 may adjust the frequency difference between signals from two signal transmitter 100a and 100b to deliver the sound to the ears. For example, when the audio signal to be delivered has a frequency of $f_0$, the controller 110 may control the respective signal transmitters 100a and 100b to output an audio signal having a frequency of $\frac{1}{2}f_0$, control the high frequency signal generator 130 of the respective signal transmitters 100a and 100b to output a high frequency signal having a frequency of $f_1$, and control the signal combiner 140 to output signals respectively having frequencies of $\frac{1}{2}f_0+f_1$ and $\frac{1}{2}f_0-f_1$. Accordingly, the output signal is combined to have the frequency components of $f_0$ and $f_1$, but $f_1$ component is beyond the audible frequency bandwidth that only $f_0$ component is sensed by ears. As described above, any combination of frequencies may be available when the audio signal having the intended frequency may be generated by combing the signals output from the respective signal transmitters 100a and 100b attached on the human body 200.

While it has been described that the signal transmitter generates the audio signal and the high frequency signal and combines the audio and high frequency signals to output the combined signal according to the exemplary embodiment of the present invention, any configuration may be available when the high frequency signals output by the two signal transmitters are offset. For example, the first signal transmitter may include the audio signal generator, the high frequency signal generator, and the signal combiner, and may combine the audio signal and the high frequency signal to output the combined signal, and the second signal transmitter may include the high frequency signal generator without including the audio signal generator and the signal combiner so as to output the high frequency signal. In the above exemplified configuration, a user may hear the sound since the high frequency signal is eliminated by the interference occurred around the auditory organ.

According to the exemplary embodiment of the present invention, a user having the signal transmitter attached thereto may hear the delivered sound without using any receiver. As a result, mobility is increased since a user participating in a communication may hear the sound without any additional receiver In addition, the security is increased because the sound does not spread into air and others around the user are not able to overhear the sound. Furthermore, no one can notice whether the user is receiving the audio signal through the sound transmission system or not, While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A sound transmission system using a human body as a propagation medium, the transmission system comprising:
    a first signal transmitter for generating an audio signal and a first high frequency signal which has a frequency at least higher than an audible frequency bandwidth; and
    a second signal transmitter for generating an audio signal and a second high frequency signal which has the same frequency as the first high frequency signal and has an opposite phase of the first high frequency signal, the first and second signal transmitters coupled to the human body,
    wherein the audio signal from the first signal transmitter and the audio signal from the second signal transmitter are the same,
    wherein the first signal transmitter combines the audio signal and the first high frequency signal to output a first combined signal to the human body, and the second signal transmitter combines the audio signal and the second high frequency signal to output a second combined signal to the human body,
    wherein the first combined signal and the second combined signal are output at the same time, and
    wherein the first and second high frequency signals among the signals output by the first and second signal transmitters are eliminated by interference around ears of the human body so that only the audio signals are delivered to an auditory organ of the human body,
    wherein the first and second signal transmitters respectively comprise a corrector which performs calibration on a signal output based on transmission characteristics of the human body and a distance between the auditory organs and the respective first and second signal transmitters.

2. The sound transmission system of claim 1, wherein the first and second signal transmitters respectively comprise:
    an audio signal generator generating an audio signal of audible frequency bandwidth;
    a high frequency signal generator generating a high frequency signal having a frequency higher than at least the audible frequency bandwidth;
    a signal combiner combining the generated audio signal and high frequency signal;
    a controller adjusting signals and frequencies respectively generated by the audio generator and the high frequency signal generator, and controlling the signal combiner to combine of the signals; and
    a transducer outputting the combined signal generated by the signal combiner to the human body.

3. The sound transmission system of claim 2, wherein the first and second signal transmitters are attached to the human body at points that are respectively the same distance from the left and right ears.

4. The sound transmission system of claim 2, wherein the first and second signal transmitters further comprise a phase shifter shifting a phase of the signal output by the signal combiner.

5. The sound transmission system of claim 4, wherein the first and second signal transmitters further comprise an amplifier performing amplification for increasing a tolerance to noise and compensating an attenuation in the human body of a signal output by the phase shifter.

6. The sound transmission system of claim 5, wherein the corrector performs calibration on the signal output by the amplifier based on transmission characteristics of the human body and a distance between the auditory organs and the respective signal transmitters.

7. The sound transmission system of claim 6, wherein the controller adjusts a phase shifted by the phase shifter.

8. The sound transmission system of claim 1, wherein the audio signal generator generates the audio signal by using data input from an external communication apparatus of the sound transmission system.

9. The sound transmission system of claim 1, each of the first and second signal transmitters comprises a hand-held type transmitter.

10. The sound transmission system of claim 1, wherein frequencies, phases, and output time legs of the audio signals and the high frequency signals are adjusted to realize a stereophonic sound effect.

11. A sound transmission system using a human body as a propagation medium, the sound transmission system comprising:
    a first signal transmitter attached to the human body at a first point and which generates a first audio signal and a first high frequency signal having a first frequency at least higher than an audible frequency bandwidth, the first signal transmitter comprising a first audio signal generator which generates the first audio signal of audible frequency bandwidth, a first high frequency signal generator which generates a first high frequency signal having a frequency higher than at least the audible frequency bandwidth, a first signal combiner which generates a first combined signal by combining the first audio signal and the first high frequency signal, a first controller adjusting signals and frequencies respectively generated by the first audio signal generator and the first high frequency signal generator, and which also controls the first signal combiner to combine the signals, a first phase shifter which shifts a phase of the first combined signal, a first amplifier which performs amplification for increasing a tolerance to noise and compensate an attenuation in the human body of a signal output by the first phase shifter, a first corrector which calibrates a signal output by the first amplifier based on transmission characteristics of the human body and a distance between the auditory organs and the first signal transmitter, and a first transducer which outputs the first combined signal to the human body; and
    a second signal transmitter attached to the human body at a second point at a distance from the first point which is equal to a distance between a left and right ear of the human body, and which generates a second audio signal and a second high frequency signal which has the same frequency as the first high frequency signal and has an opposite phase of the first high frequency signal, the second signal transmitter comprising a second audio signal generator which generates a second audio signal of audible frequency bandwidth that is equal to the first audio signal, a second high frequency signal generator which generates a second high frequency signal having a frequency higher than at least the audible frequency bandwidth, a second signal combiner which generates a second combined signal by combining the second audio signal and the second high frequency signal, a second controller which adjusts the signals and frequencies respectively generated by the second audio signal generator and the second high frequency signal generator, and which also controls the second signal combiner to combine the signals, a second phase shifter which shifts a phase of the second combined signal, a second amplifier which performs amplification for increasing a tolerance to noise and compensate an attenuation in the human body of a signal output by the second phase shifter, a second corrector which calibrates a signal output by the second amplifier based on transmission characteristics of the human body and a distance between the auditory organs and the second signal transmitter, and a second transducer which outputs the second combined signal to the human body at the same time as the first combined signal is output, wherein the first and second high frequency signals among the signals output by the first and second signal transmitters are eliminated by interference around ears of the human body so that only the audio signals are delivered to an auditory organ of the human body.

12. The sound transmission system of claim 11, wherein:
the first controller adjusts a phase shifted by the first phase shifter; and
the second controller adjusts a phase shifted by the second phase shifter.

13. The sound transmission system of claim 11, wherein:
the first audio signal generator generates the first audio signal using data input from an external communication apparatus of the sound transmission system; and
the second audio signal generator generates the second audio signal using data input from an external communication apparatus of the sound transmission system.

14. The sound transmission system of claim 11, wherein the first signal transmitter and the second signal transmitter each comprise a hand-held type transmitter.

15. The sound transmission system of claim 11, wherein:
frequencies, phases, and output time legs of the first audio signals and the first high frequency signals are adjusted to realize a stereophonic sound effect; and
frequencies, phases, and output time legs of the second audio signals and the second high frequency signals are adjusted to realize a stereophonic sound effect.

16. A sound transmission system configured to use a human body as a propagation medium, the sound transmission system comprising:
a first signal transmitter directly attached to the human body at a first distance from a first ear of the human body, the first signal transmitter being configured to generate a first audio signal and a first frequency signal having a first phase and a first frequency, the first signal transmitter comprising a first phase shifter, a first controller, a first amplifier configured to perform amplification for increasing a tolerance to noise and compensate an attenuation in the human body of a signal output by the first phase shifter, and a first corrector configured to calibrate a signal output by the first amplifier based on transmission characteristics of the human body and the first distance; and
a second signal transmitter directly attached to the human body at a second distance from a second ear of the human body, and configured to generate a second audio signal and a second high frequency signal which has an opposite phase of the first high frequency signal, the second signal transmitter comprising a second phase shifter, a second controller, a second amplifier configured to perform amplification for increasing a tolerance to noise and compensate an attenuation in the human body of a signal output by the second phase shifter, and a second corrector configured to calibrate a signal output by the second amplifier based on transmission characteristics of the human body and the second distance,
wherein the first high frequency signal and the second high frequency signal among the signals output respectively by the first signal transmitter and the second signal transmitter are eliminated by interference around ears of the human body so that only the audio signals are delivered to an auditory organ of the human body.

17. The sound transmission system of claim 16, wherein the first signal transmitter further comprises:
a first audio signal generator configured to generate the first audio signal of audible frequency bandwidth;
a first high frequency signal generator configured to generate a first high frequency signal;
a first signal combiner configured to generate a first combined signal by combining the first audio signal and the first high frequency signal; and
a first transducer configured to output the first combined signal to the human body.

18. The sound transmission system of claim 17, wherein the first phase shifter is configured to shift a phase of the first combined signal.

19. The sound transmission system of claim 17, wherein the first controller is configured to:
control the first combiner and also adjust signals and frequencies respectively generated by the first audio signal generator and the first high frequency signal generator; and
adjusts a phase shifted by the first phase shifter.

20. The sound transmission system of claim 17, wherein the first audio signal generator is configured to generate the first audio signal using data input from an external communication apparatus of the sound transmission system.

* * * * *